United States Patent
Ralston et al.

(10) Patent No.: US 10,755,692 B2
(45) Date of Patent: Aug. 25, 2020

(54) MESH-BASED DIGITAL MICROBEAMFORMING FOR ULTRASOUND APPLICATIONS

(71) Applicant: Butterfly Network, Inc., Guilford, CT (US)

(72) Inventors: Tyler S. Ralston, Clinton, CT (US); Nevada J. Sanchez, Guilford, CT (US)

(73) Assignee: Butterfly Network, Inc., Guilford, CT (US)

( * ) Notice: Subject to any disclaimer, the term of this patent is extended or adjusted under 35 U.S.C. 154(b) by 274 days.

(21) Appl. No.: 16/009,319

(22) Filed: Jun. 15, 2018

(65) Prior Publication Data

US 2018/0366102 A1 Dec. 20, 2018

Related U.S. Application Data

(60) Provisional application No. 62/521,750, filed on Jun. 19, 2017.

(51) Int. Cl.
*G01S 15/89* (2006.01)
*G10K 11/34* (2006.01)
*G01S 7/52* (2006.01)

(52) U.S. Cl.
CPC .......... *G10K 11/346* (2013.01); *G01S 7/5208* (2013.01); *G01S 15/8925* (2013.01); *G01S 15/8927* (2013.01)

(58) Field of Classification Search
CPC . G10K 11/346; G01S 15/8927; G01S 7/5208; G01S 15/8925
See application file for complete search history.

(56) References Cited

U.S. PATENT DOCUMENTS

| | | | |
|---|---|---|---|
| 5,520,187 | A | 5/1996 | Snyder |
| 5,817,024 | A | 10/1998 | Ogle et al. |
| 7,583,214 | B2 | 9/2009 | Liu et al. |
| 8,066,642 | B1 | 11/2011 | Little et al. |
| 8,852,103 | B2 | 10/2014 | Rothberg et al. |
| 9,229,097 | B2 | 1/2016 | Rothberg et al. |
| 9,521,991 | B2 | 12/2016 | Rothberg et al. |
| 9,592,030 | B2 | 3/2017 | Rothberg et al. |

(Continued)

FOREIGN PATENT DOCUMENTS

| | | | | |
|---|---|---|---|---|
| AU | 2018288656 A1 | * | 12/2019 | ........... G10K 11/346 |
| CA | 3064439 A1 | * | 12/2018 | ........... G10K 11/346 |
| WO | WO-2018236683 A1 | * | 12/2018 | ........... G10K 11/346 |

OTHER PUBLICATIONS

International Search Report and Written Opinion dated Aug. 30, 2018 in connection with International Application No. PCT/US2018/037769.

(Continued)

*Primary Examiner* — Daniel Pihulic
(74) *Attorney, Agent, or Firm* — Wolf, Greenfield & Sacks, P.C.

(57) ABSTRACT

A digital microbeamformer apparatus for an ultrasound system includes a plurality of interconnected nodes, with one or more nodes corresponding to at least one channel of the ultrasound system. One or more nodes is configured to communicate data with one or more other nodes via a corresponding beamforming data path, and one or more nodes is coupled to a data output bus shared by one or more other nodes.

35 Claims, 13 Drawing Sheets

(56) References Cited

U.S. PATENT DOCUMENTS

| | | |
|---|---|---|
| 9,592,032 B2 | 3/2017 | Rothberg et al. |
| 2007/0242567 A1 | 10/2007 | Daft et al. |
| 2009/0016163 A1 | 1/2009 | Freeman et al. |
| 2009/0171213 A1 | 7/2009 | Savord |
| 2011/0055447 A1 | 3/2011 | Costa |
| 2014/0240482 A1 | 8/2014 | Ikeda et al. |
| 2015/0080724 A1 | 3/2015 | Rothberg et al. |
| 2015/0297183 A1* | 10/2015 | Freeman ............ G01S 15/8927 600/459 |
| 2017/0202541 A1 | 7/2017 | Ralston |
| 2017/0307741 A1 | 10/2017 | Ralston et al. |
| 2017/0360397 A1 | 12/2017 | Rothberg et al. |
| 2018/0366102 A1* | 12/2018 | Ralston ............... G01S 15/8927 |

OTHER PUBLICATIONS

Daft et al., A Matrix Transducer Design with Improved Image Quality and Acquisition Rate. 2007 IEEE Ultrasonics Symposium. Oct. 1, 2007;411-5.

Daft et al., Microfabricated Ultrasonic Transducers Monolithically Integrated with High Voltage Electronics. 2004 IEEE Ultrasonics Symposium. Aug. 23, 2004;493-6.

Gurun et al., Front-end CMOS Electronics for Monolithic Integration with CMUT Arrays: Circuit Design and Initial Experimental Results. 2008 IEEE International Ultrasonics Symposium Proceedings. 2008;390-3.

International Preliminary Report on Patentability dated Jan. 2, 2020 in connection with International Application No. PCT/US2018/037769.

* cited by examiner

MESH-BASED DIGITAL MICROBEAMFORMING FOR ULTRASOUND APPLICATIONS

CROSS-REFERENCE TO RELATED APPLICATIONS

This Application claims the benefit under 35 U.S.C. § 119(e) of U.S. Provisional Application Ser. No. 62/521,750, filed on Jun. 19, 2017, and entitled "MESH-BASED DIGITAL MICROBEAMFORMING FOR ULTRASOUND APPLICATIONS," which is hereby incorporated herein by reference in its entirety.

BACKGROUND

The present disclosure relates to ultrasound imaging and/or treatment. In particular, the present disclosure relates to mesh-based, digital microbeamforming for ultrasound applications.

Ultrasound devices may be used to perform diagnostic imaging and/or treatment. Ultrasound imaging may be used to see internal soft tissue body structures, and to find a source of disease or to exclude any pathology. Ultrasound devices use sound waves with frequencies that are higher with respect to those audible to humans. Ultrasonic images are made by transmitting pulses of ultrasound into tissue using a probe. The sound waves are reflected off the tissue, with different tissues reflecting varying degrees of sound. These reflected sound waves may be recorded and displayed as an image to the operator. The strength (amplitude) of the sound signal and the time it takes for the wave to travel through the body provide information used to produce an image.

Many different types of images can be formed using ultrasound devices. The images can be real-time images. For example, images can be generated that show two-dimensional cross-sections of tissue, blood flow, motion of tissue over time, the location of blood, the presence of specific molecules, the stiffness of tissue, or the anatomy of a three-dimensional region.

SUMMARY

In one embodiment, a digital microbeamformer apparatus for an ultrasound system includes a plurality of interconnected nodes, one or more nodes corresponding to a single channel of the ultrasound system; one or more nodes configured to communicate beamforming data with one or more other nodes via a corresponding beamforming data path; and one or more nodes coupled to a data output bus shared by one or more other nodes.

In another embodiment, an ultrasound system includes a complementary metal oxide semiconductor (CMOS) die (sometimes referred to herein simply as a "MOS" die) having ultrasonic transducers and integrated circuitry formed thereon, the integrated circuitry further including a digital microbeamformer apparatus having a plurality of interconnected nodes, one or more nodes corresponding to a single channel of the ultrasound system; one or more nodes configured to communicate beamforming data with one or more other nodes via a corresponding beamforming data path; and one or more nodes coupled to a data output bus shared by one or more other nodes.

BRIEF DESCRIPTION OF THE DRAWINGS

Various aspects and embodiments of the disclosed technology will be described with reference to the following Figures. It should be appreciated that the figures are not necessarily drawn to scale. Items appearing in multiple figures are indicated by the same reference number in all the figures in which they appear.

DETAILED DESCRIPTION

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these embodiments are provided so that this disclosure clearly satisfies applicable legal requirements. Like numbers refer to like elements throughout.

In large 2-D phased array ultrasound systems, it can be very expensive to transfer all of the data from the independent sensors to the image processing and reconstruction system. One method for reducing the channel count is to perform part of the image formation process close to the sensor node by dividing the 2-D array into smaller 2-D subarrays. The channels within the subarray are then delayed and combined to produce one signal for the entire subarray. In order to create high quality imagery, the method of combining the signals within the subarray is similar to the beamforming process used by the downstream processing to form the complete image. This approach enables real-time ultrasound imaging in 3D (or real time, higher quality 2D imaging with better slice selection and resolutions) with substantially lower bandwidth from the integrated receiver device.

Using low-power integrated analog-to-digital converter (ADC) architectures, it is possible to locally digitize the signal from each channel in the array. A method is disclosed herein that performs microbeamforming on the digitized elements within a subarray. In brief, this approach employs a distributed mesh where one or more nodes are capable of combining and incrementally delaying the signals from its neighbor nodes and, in some embodiments, one or more nodes are capable of combining and incrementally delaying the signals from its neighbor nodes. The configuration of the mesh is fully programmable. The advantages of such a digital microbeamformer include, for example, the flexibility to configure the subarray geometry and a quicker design time for the beamformer (as compared to an analog beamformer).

Beamforming refers to the operation of delaying signals from multiple channels to align the signals acoustically in a given direction. For example, in a linear transducer array with delays that are used to focus at a particular point in the imaging scene, center elements are delayed more than outer elements. In a microbeamforming architecture, the delays for an entire array are factored into fine intra-subarray delay profiles and coarse inter-subarray delay profiles. When the final beamforming is performed on the micro-beamformed subarray signals, the end result is (to first order) equivalent to the fully beamformed result. An advantage is that fewer channels are transferred from the sensor device (which includes integrated receive electronics and microbeamformer) to the processing device.

Figure 1:
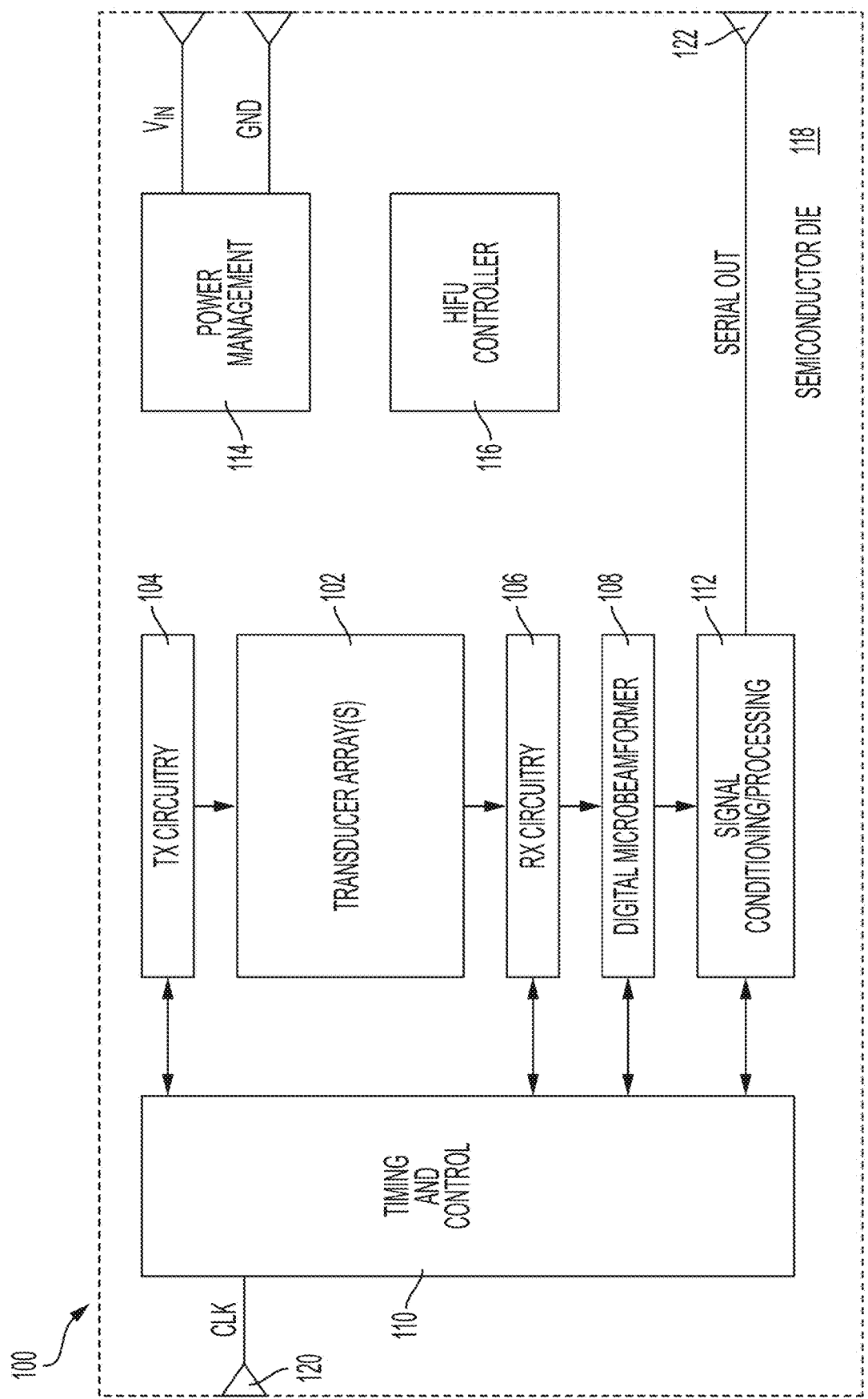
FIG. 1 is a schematic block diagram of a monolithic ultrasound device including a mesh-based digital microbeamformer, in accordance with exemplary embodiments.

FIG. 1 shows an illustrative example of a monolithic ultrasound device 100 embodying various aspects of the technology described herein. As shown, the device 100 may include one or more transducer arrangements (e.g., arrays) 102, transmit (TX) circuitry 104, receive (RX) circuitry 106, a digital microbeamformer circuit 108, a timing & control circuit 110, a signal conditioning/processing circuit 112, a power management circuit 114, and optionally a high-intensity focused ultrasound (HIFU) controller 116. In the embodiment shown, all of the illustrated elements are formed on a single semiconductor die 118. It should be appreciated, however, that in alternative embodiments one or more of the illustrated elements may be instead located off-chip, for example on a separate die. It should also be appreciated that communication between one or more of the illustrated components may be performed in any of numerous ways. In some embodiments, for example, one or more high-speed busses (not shown), such as that employed by a unified Northbridge, may be used to allow high-speed intra-chip communication or communication with one or more off-chip components.

The one or more transducer arrays 102 may take on any of numerous forms, and aspects of the present technology do not necessarily require the use of any particular type or arrangement of transducer cells or transducer elements. Indeed, although the term "array" is used in this description, it should be appreciated that in some embodiments the transducer elements may not be organized in an array and may instead be arranged in some non-array fashion. In various embodiments, each of the transducer elements in the array 102 may, for example, include one or more capacitive micromachined ultrasonic transducers (CMUTs), one or more CMOS ultrasonic transducers (CUTs), one or more piezoelectric micromachined ultrasonic transducers (PMUTs), and/or one or more other suitable ultrasonic transducer cells. In some embodiments, the transducer elements of the transducer array 102 may be formed on the same chip as the electronics of the TX circuitry 104 and/or RX circuitry 106. The transducer elements 102, TX circuitry 104, and RX circuitry 106 may, in some embodiments, be integrated in a single ultrasound probe. In some embodiments, the single ultrasound probe may be a handheld probe. In other embodiments, the single ultrasound probe may be embodied in a patch that may be coupled to a patient, or in a pill that may be ingested by a patient. The patch may be configured to transmit, wirelessly, data collected by the patch to one or more external devices for further processing.

A CUT may, for example, include a cavity formed in a CMOS (or "MOS") wafer, with a membrane overlying the cavity, and in some embodiments sealing the cavity. Electrodes may be provided to create a transducer cell from the covered cavity structure. The CMOS wafer may include integrated circuitry to which the transducer cell may be connected. The transducer cell and CMOS wafer may be monolithically integrated, thus forming an integrated ultrasonic transducer cell and integrated circuit on a single substrate (the CMOS wafer). The transducer cell may also be coupled with the CMOS wafer via one or more interposer substrates, such as an electrical substrate.

The TX circuitry 104 may, for example, generate pulses that drive the individual elements of, or one or more groups of elements within, the transducer array(s) 102 so as to generate acoustic signals to be used for imaging. The RX circuitry 106, on the other hand, may receive and process electronic signals generated by the individual elements of the transducer array(s) 102 when acoustic signals impinge upon such elements. Further details regarding the digital microbeamformer circuit 108 are described hereinafter.

In some embodiments, the timing & control circuit 110 may, for example, be responsible for generating all timing and control signals that are used to synchronize and coordinate the operation of the other elements in the device 100. In the example shown, the timing & control circuit 110 is driven by a single clock signal CLK supplied to an input port 120. The clock signal CLK may, for example, be a high-frequency clock used to drive one or more of the on-chip circuit components. In some embodiments, the clock signal CLK may, for example, be a 1.5625 GHz or 2.5 GHz clock used to drive a high-speed serial output device (not shown in FIG. 1) in the signal conditioning/processing circuit 110, or a 20 Mhz or 40 MHz clock used to drive other digital components on the die 118, and the timing & control circuit 110 may divide or multiply the clock CLK, as necessary, to drive other components on the die 118. In other embodiments, two or more clocks of different frequencies (such as those referenced above) may be separately supplied to the timing & control circuit 110 from an off-chip source.

The power management circuit 120 may, for example, be responsible for converting one or more input voltages $V_{IN}$ from an off-chip source (not shown) into voltages needed to carry out operation of the chip, and for otherwise managing power consumption within the device 100. In some embodiments, for example, a single voltage (e.g., 12 V, 80 V, 100 V, 120 V, etc.) may be supplied to the chip and the power management circuit 114 may step that voltage up or down, as necessary, using a charge pump circuit or via some other DC-to-DC voltage conversion mechanism. In other embodiments, multiple different voltages may be supplied separately to the power management circuit 114 for processing and/or distribution to the other on-chip components.

As shown in FIG. 1, in some embodiments, a HIFU controller 116 may be integrated on the die 118 so as to enable the generation of HIFU signals via one or more elements of the transducer array(s) 102. In other embodiments, a HIFU controller for driving the transducer array(s) 102 may be located off-chip, or even within a device separate from the device 100. That is, aspects of the present disclosure relate to provision of ultrasound-on-a-chip HIFU systems, with and without ultrasound imaging capability. It should be appreciated, however, that some embodiments may not have any HIFU capabilities and thus may not include a HIFU controller 116.

Moreover, it should be appreciated that the HIFU controller 116 may not represent distinct circuitry in those embodiments providing HIFU functionality. For example, in some embodiments, the remaining circuitry of FIG. 1 (other than the HIFU controller 120) may be suitable to provide ultrasound imaging functionality and/or HIFU, i.e., in some embodiments the same shared circuitry may be operated as an imaging system and/or for HIFU. Whether or not imaging or HIFU functionality is exhibited may depend on the power provided to the system. HIFU typically operates at higher powers than ultrasound imaging. Thus, providing the system a first power level (or voltage level) appropriate for imaging applications may cause the system to operate as an imaging system, whereas providing a higher power level (or voltage level) may cause the system to operate for HIFU. Such power management may be provided by off-chip control circuitry in some embodiments.

In addition to using different power levels, imaging and HIFU applications may utilize different waveforms. Thus, waveform generation circuitry may be used to provide suitable waveforms for operating the system as either an imaging system or a HIFU system.

In some embodiments, the system may operate as both an imaging system and a HIFU system (e.g., capable of providing image-guided HIFU). In some such embodiments, the same on-chip circuitry may be utilized to provide both functions, with suitable timing sequences used to control the operation between the two modalities.

In the example shown, one or more output ports 122 may output a high-speed serial data stream generated by one or more components of the signal conditioning/processing circuit 112. Such data streams may, for example, be generated by one or more USB 3.0 modules, and/or one or more 10 GB, 40 GB, or 100 GB Ethernet modules, integrated on the die 118. In some embodiments, the signal stream produced on output port 122 can be fed to a computer, tablet, or smartphone for the generation and/or display of 2-dimensional, 3-dimensional, and/or tomographic images. In embodiments in which image formation capabilities are incorporated in the signal conditioning/processing circuit 112, even relatively low-power devices, such as smartphones or tablets which have only a limited amount of processing power and memory available for application execution, can display images using only a serial data stream from the output port 122. As noted above, the use of on-chip analog-to-digital conversion and a high-speed serial data link to offload a digital data stream is one of the features that helps facilitate an "ultrasound on a chip" solution according to some embodiments of the technology described herein.

Devices 100 such as that shown in FIG. 1 may be used in any of a number of imaging and/or treatment (e.g., HIFU) applications, and the particular examples discussed herein should not be viewed as limiting. In one illustrative implementation, for example, an imaging device including an N x M planar or substantially planar array of CMUT elements may itself be used to acquire an ultrasonic image of a subject, e.g., a person's abdomen, by energizing some or all of the elements in the array(s) 102 (either together or individually) during one or more transmit phases, and receiving and processing signals generated by some or all of the elements in the array(s) 102 during one or more receive phases, such that during each receive phase the CMUT elements sense acoustic signals reflected by the subject. In other implementations, some of the elements in the array(s) 102 may be used only to transmit acoustic signals and other elements in the same array(s) 102 may be simultaneously used only to receive acoustic signals.

Moreover, in some implementations, a single imaging device may include a P×Q array of individual devices, or a P×Q array of individual N×M planar arrays of CMUT elements, which components can be operated in parallel, sequentially, or according to some other timing scheme so as to allow data to be accumulated from a larger number of CMUT elements than can be embodied in a single device 100 or on a single die 114.

In yet other implementations, a pair of imaging devices can be positioned so as to straddle a subject, such that one or more CMUT elements in the device(s) 100 of the imaging device on one side of the subject can sense acoustic signals generated by one or more CMUT elements in the device(s) 100 of the imaging device on the other side of the subject, to the extent that such pulses were not substantially attenuated by the subject. Moreover, in some implementations, the same device 100 can be used to measure both the scattering of acoustic signals from one or more of its own CMUT elements as well as the transmission of acoustic signals from one or more of the CMUT elements disposed in an imaging device on the opposite side of the subject.

Figure 2:
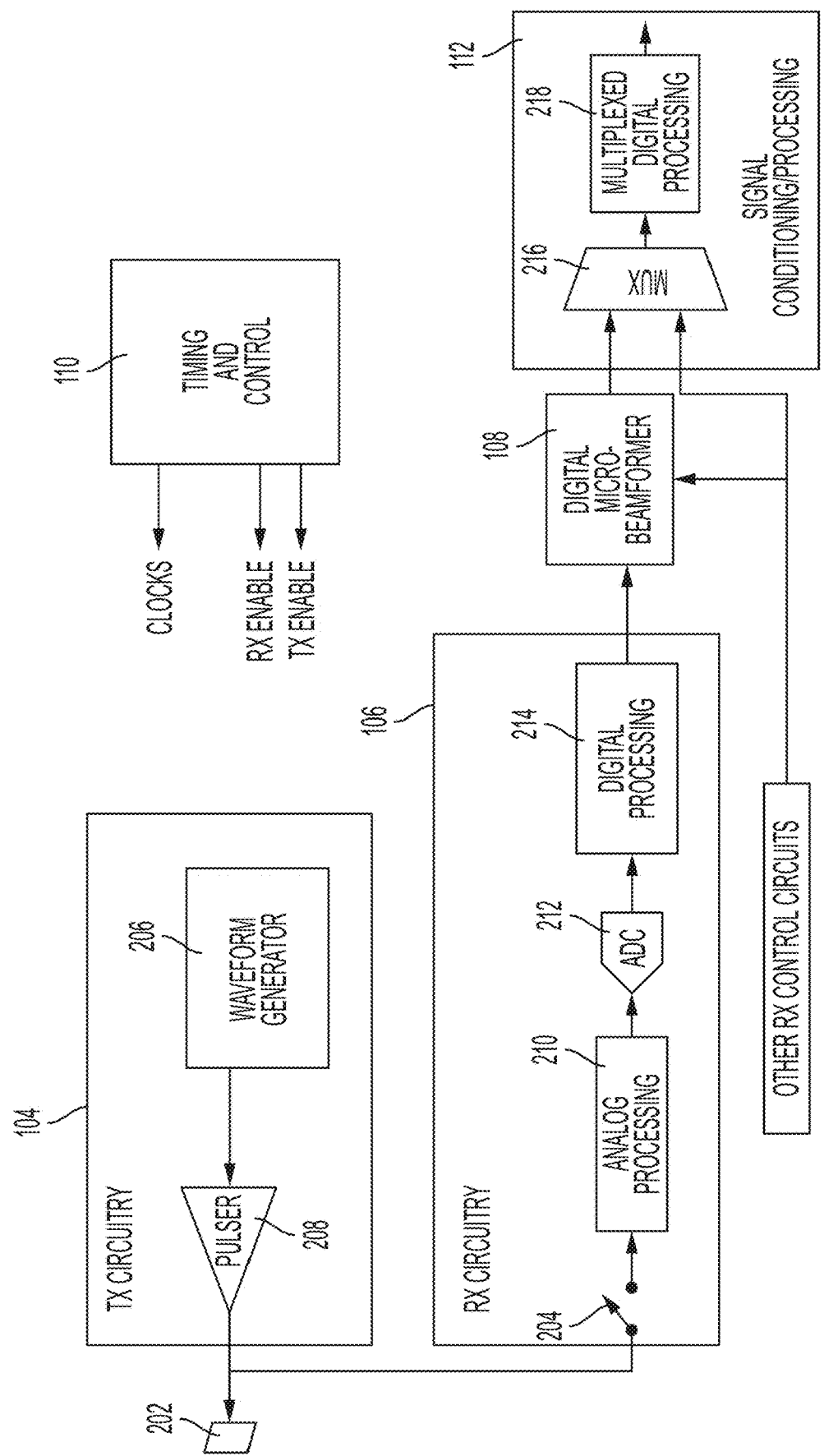
FIG. 2 is a schematic block diagram illustrating certain components of FIG. 1 in greater detail.

FIG. 2 is a block diagram illustrating how, in some embodiments, the TX circuitry 104 and the RX circuitry 106 for a given transducer element 202 may be used either to energize the transducer element 202 to emit an ultrasonic pulse, or to receive and process a signal from the transducer element 202 representing an ultrasonic pulse sensed by it. In some implementations, the TX circuitry 104 may be used during a "transmission" phase, and the RX circuitry may be used during a "reception" phase that is non-overlapping with the transmission phase. In various embodiments, TX circuitry 104 and/or RX circuitry 106 may include a TX circuit and/or an RX circuit associated with a single transducer cell (e.g., a CUT or CMUT), a group of two or more transducer cells within a single transducer element 202, a single transducer element 202 comprising a group of transducer cells, a group of two or more transducer elements 202 within an array 102, or an entire array 102 of transducer elements 202.

In the example shown in FIG. 2, the TX circuitry 104/RX circuitry 106 includes a separate TX circuit and a separate RX circuit for each transducer element 202 in the array(s) 102, but there is only one instance of each of the timing & control circuit 110, the digital microbeamformer circuit 108, and the signal conditioning/processing circuit 112. Accordingly, in such an implementation, the timing & control circuit 110 may be responsible for synchronizing and coordinating the operation of all of the TX circuitry 104/RX circuitry 106 combinations on the die 118, and the signal conditioning/processing circuit 112 may be responsible for handling inputs from all of the RX circuitry 106 on the die 118. In other embodiments, timing and control circuit 110 may be replicated for each transducer element 202 or for a group of transducer elements 202. Again, further details regarding the digital microbeamformer circuit 108 are described hereinafter.

As shown in FIG. 2, in addition to generating and/or distributing clock signals to drive the various digital components in the device 100, the timing & control circuit 110 may output either an "TX enable" signal to enable the operation of each TX circuit of the TX circuitry 104, or an "RX enable" signal to enable operation of each RX circuit of the RX circuitry 106. In the example shown, a switch 204 in the RX circuitry 106 may always be opened before the TX circuitry 104 is enabled, so as to prevent an output of the TX circuitry 104 from driving the RX circuitry 106. The switch 204 may be closed when operation of the RX circuitry 106 is enabled, so as to allow the RX circuitry 106 to receive and process a signal generated by the transducer element 202.

As shown, the TX circuitry 104 for a respective transducer element 202 may include both a waveform generator 206 and a pulser 208. The waveform generator 206 may, for example, be responsible for generating a waveform that is to be applied to the pulser 208, so as to cause the pulser 208 to output a driving signal to the transducer element 202 corresponding to the generated waveform.

In the example shown in FIG. 2, the RX circuitry 106 for a respective transducer element 202 includes an analog processing block 210 (which provides functions such as, for example, offset cancellation and time gain compensation (TGC)), an analog-to-digital converter (ADC) 212, and a digital processing block 214. The ADC 212 may, for example, comprise an 8-bit, 10-bit or 12-bit, 20 Msps, 25 Msps, 40 Msps, 50 Msps, or 80 Msps ADC.

After undergoing processing in the digital processing block 214 (and in the digital microbeamformer circuit 108 as described hereinafter), the outputs of all of the RX circuits on the die 118 (the number of which, in this example, is equal to the number of transducer elements 204 on the chip) are fed to a multiplexer (MUX) 216 in the signal conditioning/processing circuit 112. In other embodiments, the number of transducer elements may be larger than the number of RX circuits, and several transducer elements provide signals to a single RX circuit. The MUX 216 multiplexes the digital data from the RX circuits, and the output of the MUX 216 is fed to a multiplexed digital processing block 218 in the signal conditioning/processing circuit 110, for final processing before the data is output from the die 118, e.g., via one or more high-speed serial output ports 122. The MUX 216 is optional, and in some embodiments parallel signal processing is performed. A high-speed serial data port may be provided at any interface between or within blocks, any interface between chips and/or any interface to a host. Various components in the analog processing block 210, the digital processing block 214 and/or the digital microbeamformer circuit 108 may reduce the amount of data that needs to be output from the die 118 via a high-speed serial data link or otherwise. In some embodiments, for example, one or more components in the analog processing block 210 and/or the digital processing block 214 may thus serve to allow the RX circuitry 106 to receive transmitted and/or scattered ultrasound pressure waves with an improved signal-to-noise ratio (SNR) and in a manner compatible with a diversity of waveforms. The inclusion of such elements may thus further facilitate and/or enhance the disclosed "ultrasound-on-a-chip" solution in some embodiments.

Figure 3:
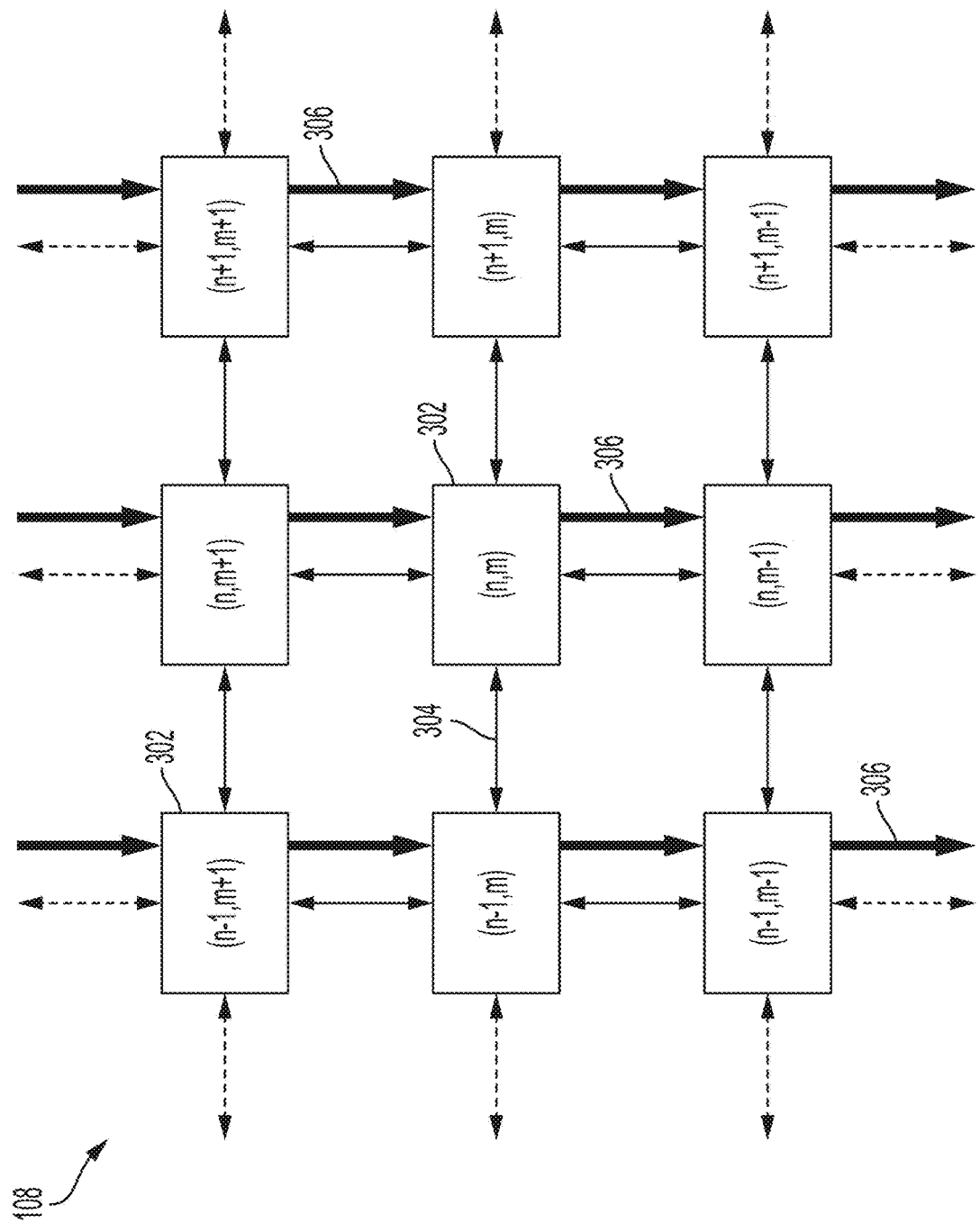
FIG. 3 is a schematic diagram of the mesh-based digital microbeamformer, according to an exemplary embodiment.

Referring now to FIG. 3, a schematic block diagram of an exemplary mesh topology for the digital microbeamformer circuit 108 is illustrated. As is shown, the digital microbeamformer circuit 108 includes a plurality of interconnected nodes, hereinafter also referred to as "microbeamformer mesh units" or more simply "mesh units" 302. One or more mesh units 302 correspond to a single digitized channel (sensor element). For at least one (e.g., two or more, and in some embodiments each) mesh unit 302, there are two general types of data signal paths involved in the beamforming operation. In the illustrated example, the thin bi-directional arrows 304 denote available beamforming data paths through each mesh unit 302, whereas the thicker uni-directional arrows indicate data offload paths of a shared data output bus 306. In the embodiment depicted in FIG. 3, the beamforming paths allow each mesh unit 302 to deliver its data stream to each of its 4 immediate neighboring mesh units 302. For example, the mesh unit 302 positioned at column/row location (n, m) may directly communicate beamforming data with its neighbors in adjacent columns (n−1, m) and (n+1, m), as well as with its neighbors in adjacent rows (n, m−1) and (n, m+1). Also, in the illustrated embodiment, mesh units 302 arranged in a given column share a common data output bus 306. Other arrangements for sharing a data output bus 306 are also contemplated, however (e.g., by row or other arrangement).

Figure 4:
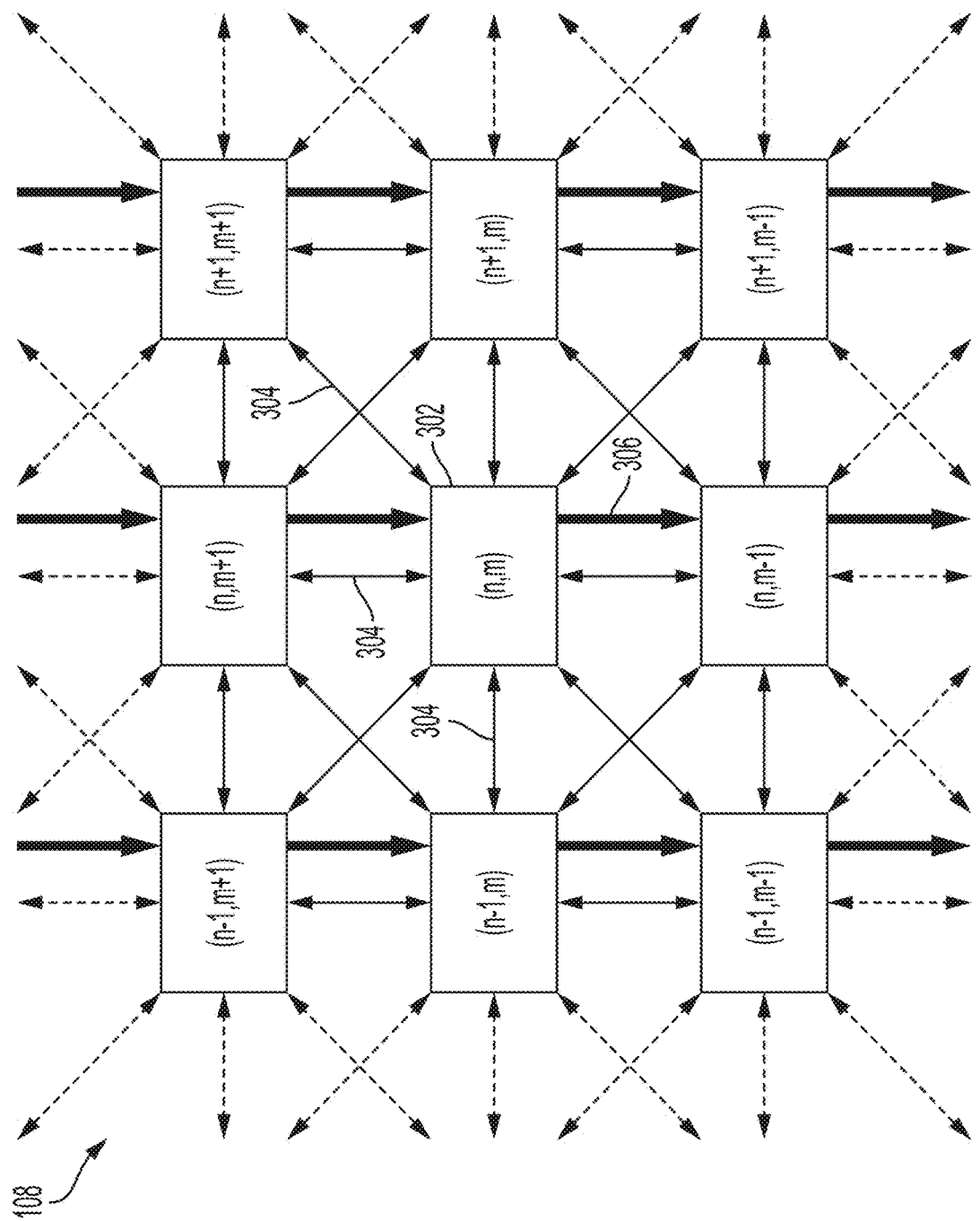
FIG. 4 is a schematic diagram of the mesh-based digital microbeamformer, according to another exemplary embodiment.

In an alternative embodiment, one or more (e.g., two or more and in some embodiments each) mesh units 302 may directly communicate beamforming data with additional neighbors. For example, as shown in FIG. 4, the mesh unit 302 positioned at column/row location (n, m) additionally communicates with "diagonally" disposed neighbors. Thus, at least one (e.g., two or more, and in some embodiments each) mesh unit 302 communicates beamforming data with 8 neighboring mesh units 302. It will be appreciated, however, that other interconnection schemes are also contemplated. For example, in a more general embodiment, a mesh unit 302 may communicate beamforming data with one or more additional mesh units 302, independent of proximity.

For purposes of clarity and simplicity, only data signal paths are depicted in FIG. 3 and FIG. 4. That is, other connections, such as control signal paths, are not depicted in FIG. 3 and FIG. 4 but instead are illustrated in further detail hereinafter.

Figure 5:
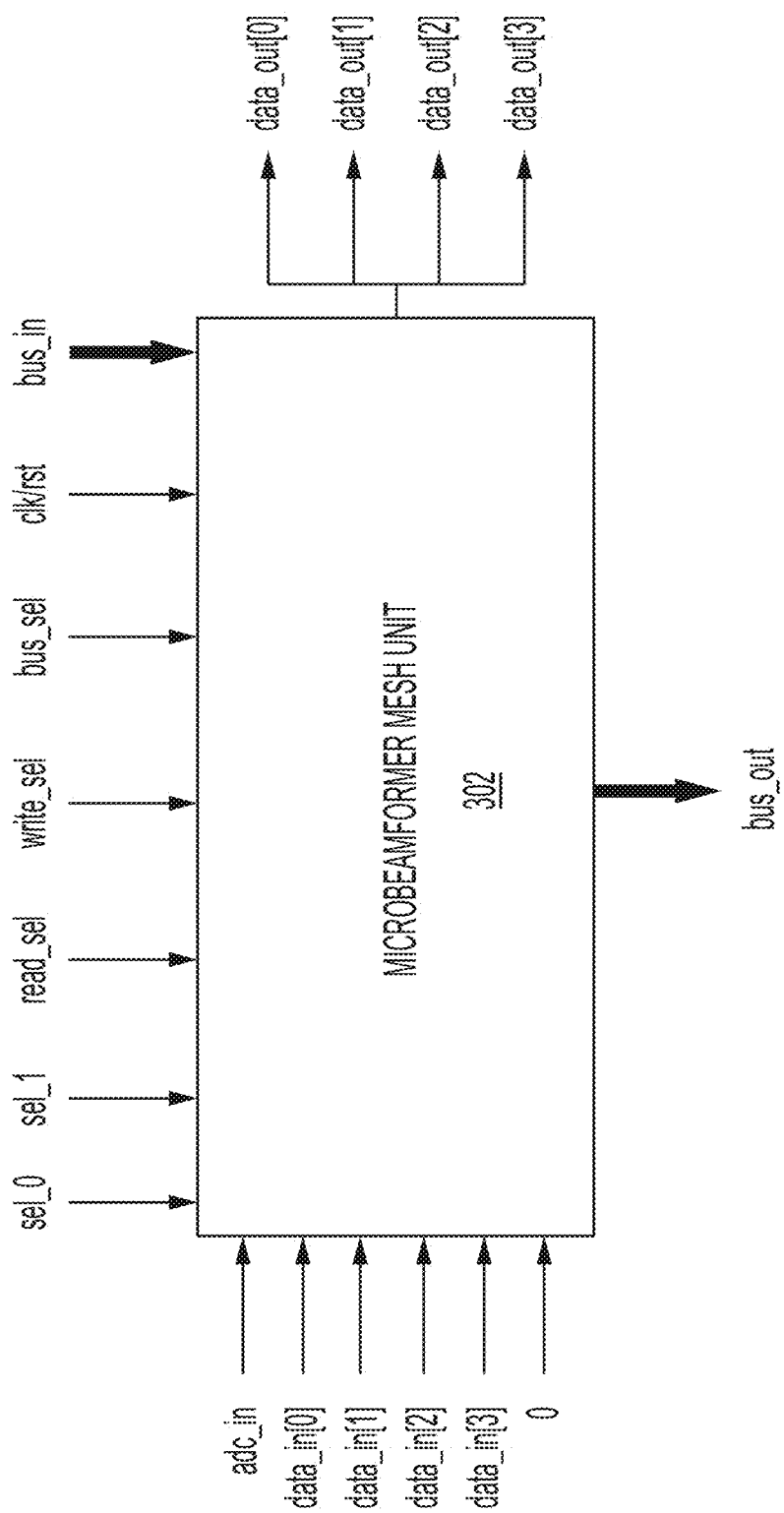
FIG. 5 is a schematic diagram illustrating in further detail the architecture of the individual microbeamformer mesh unit of FIG. 3, according to an exemplary embodiment.

Referring now to FIG. 5, there is shown a schematic block diagram of an individual microbeamformer mesh unit 302. The embodiment illustrated in FIG. 5 corresponds to the configuration of FIG. 3, where the mesh unit 302 communicates beamforming data with 4 neighboring mesh units 302. As particularly shown in FIG. 5, incoming beamforming data from the 4 neighboring mesh units 302 is represented by the signals data_in[0], data_in[1], data_in[2] and data_in[3]. Correspondingly, outgoing beamforming data to the 4 neighboring mesh units 302 is represented by the signals data_out[0], data_out[1], data_out[2] and data_out[3]. It should be appreciated that there would be additional data inputs to and outputs from a given mesh unit 302 for a topology such as in FIG. 4 (e.g., data_in[0] . . . data_in[7], data_out[0] . . . data_out[7]). In this non-limiting example, each mesh unit 302 further receives its own digitized channel data from a corresponding transducer element, represented by the signal adc_in, as well as the constant "0," as another beamforming data input thereto. The aforementioned data output bus 306 in FIG. 3 is represented in FIG. 5 by the arrows bus_in and bus_out. In addition to illustrating beamforming data paths and offload data paths, FIG. 5 also depicts control signals received as inputs to each mesh unit 302. These control signals, described in further detail below, include sel_0, sel_1, read_sel, write_sel, bus_sel, and clk/rst.

Figure 6:
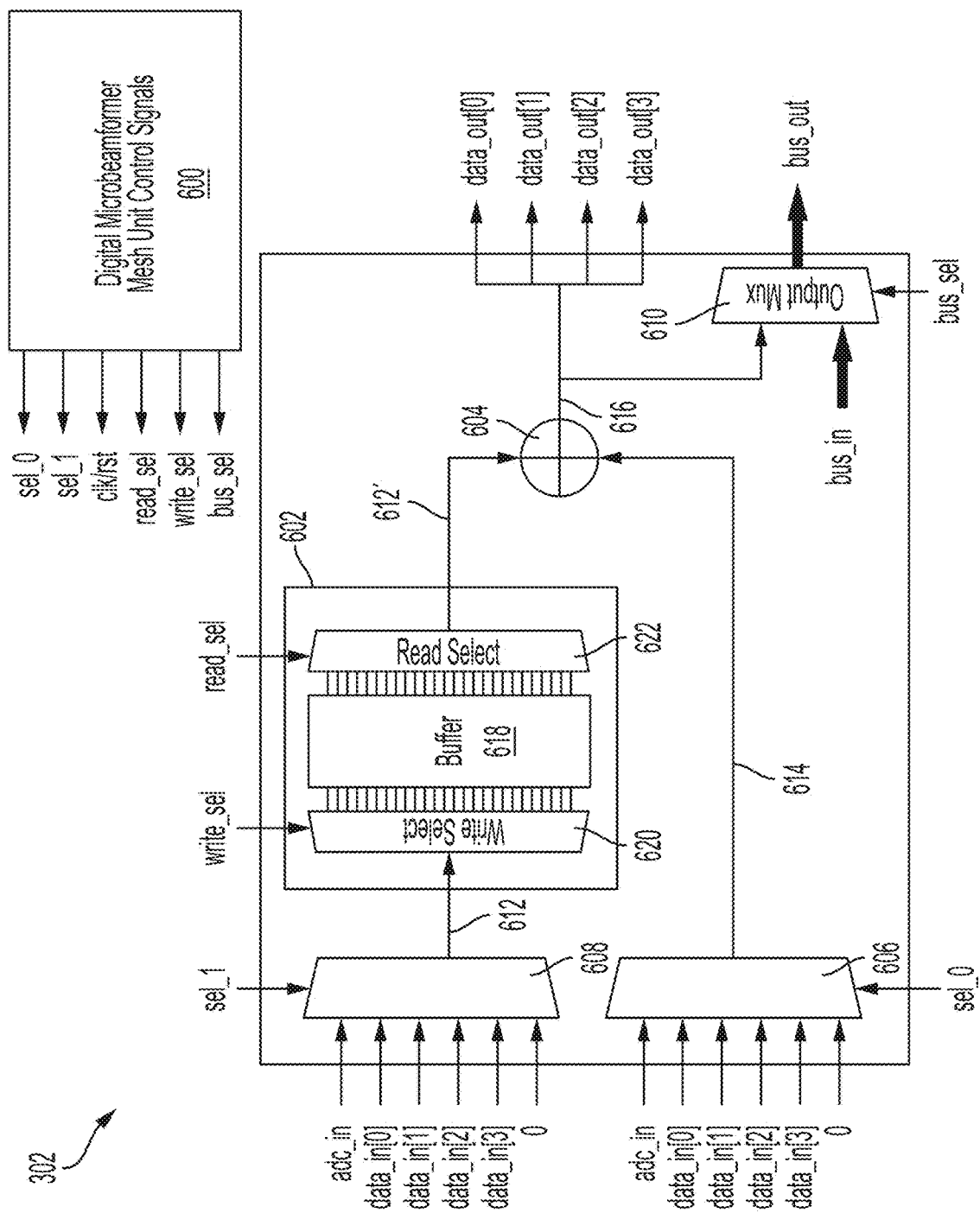
FIG. 6 is a schematic diagram illustrating the individual microbeamformer mesh unit of FIG. 4 in further detail.

Operation of the microbeamforming mesh unit 302 of FIG. 3 and FIG. 5 may be further understood with reference to FIG. 6, which illustrates in further detail the microbeamforming mesh unit architecture. As shown in FIG. 6 and as described above, at least one (e.g., two or more, and in some embodiments each) mesh unit 302 may be controlled by one or more delay mesh unit control signals, collectively provided to the mesh unit 302 by digital microbeamformer mesh unit control signals block 600. Block 600 may be implemented using one or more "on-chip" components integrated with the single substrate device on which delay mesh unit 302 is integrated, by one or more "off-chip" components such as one or more computing device(s) coupled to the single substrate ultrasound device, but not integrated with it, or by one or more on-chip and one or more off-chip components.

As further illustrated in FIG. 6, the mesh unit 302 includes a digital delay unit 602 and arithmetic logic unit (e.g., an adder, subtractor, or other Boolean logic device) 604. A first multiplexer 606 is configured to select, via control signal sel_0, which of the six data input signals adc_in, data_in[0], data_in[1], data_in[2], data_in[3] and "0" are passed directly as a first input to the adder 604. A second multiplexer 608 selects, via control signal sel_1, which of the same six data input signals adc_in, data_in[0], data_in[1], data_in[2], data_in[3] and "0" are fed to the digital delay unit 602 before passing a delayed version thereof as a second input to the adder 604. In addition, a third multiplexer 610 ("Output Mux") is used as a data offload controller to dynamically select an appropriate time period to inject data onto the shared data output bus (bus_in/bus_out).

In essence, an operation of the microbeamforming mesh unit 302 is to delay a first data input stream 612 (either selected from a neighbor node, or from the local channel ADC), sum the resulting delayed first data input stream 612' with a second data input stream 614 (either selected from a neighbor node, or from the local channel ADC), and send the resulting summed data stream 616 out to each of the neighbor nodes (any of which may or may not use the resulting input stream for its own delay calculation). This capability allows for the construction of an incrementally fine delay profile. Because the maximum delay between adjacent transducer elements is significantly smaller than the maximum delays across units within an array aperture and even across a subarray, a relatively small delay unit may be implemented. The operation of the digital delay unit 602 may be commensurate to the ADC input sampling rate. Optionally, a finer resolution may be desired for these delays, which may be implemented by including either an interpolator (not shown) after the ADC, or by selecting the sampling phase of the ADC using a finer clock (which is less costly in computing resources). This fine delay may be fixed or dynamic, as well as the control signals (write_sel, read_sel) controlling the digital delay unit 602.

In the exemplary embodiment depicted, the digital delay unit 602 includes a buffer 618, write select circuitry 620 configured to control (in response to the write_sel control signal) the location(s) in buffer 618 to which the first data input stream 612 is to be written, and read select circuitry 622 configured to control (in response to the read_sel control signal) the location(s) in buffer 618 from which to read a signal to be provided as the delayed first data input stream 612' (i.e., second data input stream) to the adder 604. It should be appreciated that the digital delay unit 602 represents just one possible embodiment of a delay unit and that a delay unit may be implemented in any other suitable way, as aspects of the technology described herein are not limited in this respect.

In some embodiments, buffer 618 may be implemented as a shift register. In such embodiments, each of the write select circuitry 620 and the read select circuitry 622 may be implemented using one or more multiplexers respectively configured to select the location(s) in buffer 618 to which to write an input signal and from which to read an output signal. In other embodiments, buffer 618 may be implemented as addressable memory. In such embodiments, each of the write select circuitry 620 and the read select circuitry 622 may be configured to use one or more pointers to select the location(s) in buffer 618 to which to write an input signal and from which to read an output signal. The pointer may be incremented in any suitable way, as aspects of the technology provided herein are not limited in this respect. It should further be appreciated that buffer 618 is not limited to being implemented as a shift register or addressable memory and may be implemented in any other suitable way. Regardless of the manner in which the buffer 618 is implemented, it may be configured to store an input signal of any suitable size. As one non-limiting example, buffer 618 may be configured to store 10 values or less, 20 values or less, 30 values or less, 50 values or less, 100 values or less between 10-100 values, between 50 and 500 values, between 100 and 1000 values, between 500 and 1000 values or any other suitable number of values. In turn, each value may consist of any suitable number of bits (e.g., one bit, two bits, four bits, eight bits, 16 bits, 32 bits, 64 bits, 128 bits, 256 bits, etc.).

More broadly stated, the digital delay unit 602 may be instantiated with memory, (whether a set of registers, cache, or shared memory,) and control logic where data is written to and retrieved from the memory in a round-robin manner (other terms include cyclic executive or cooperative multi-tasking manner). Relative choices between management control logic and operation schemes may be determined as a trade-off between characteristics such as power, timing, or other infrastructural considerations, for example. In one embodiment, scheduling control may be accomplished by incrementing a write pointer(s) for the data being written and the read pointer(s) for the data being read. Write pointer(s) and read pointer(s) may be incremented jointly or independently in the control logic. In some embodiments, the data can be placed in the buffer with the write selector where it then moves through the buffer at a known pace and where it can be retrieved at a certain point in the buffer by the read selector. It is understood that a hybrid approach may be chosen to balance the trade-offs.

Furthermore, control logic may implement an arbitrary amount of delay, (e.g. number of cycles), between the read and write operations. In one embodiment, data may be overwritten as new data is written to the digital delay unit 602. In another embodiment, data may be deleted as it is read from the digital delay unit 602. Thus, it may be considered as a matter of "bookkeeping" to implement the overall number of digital microbeamforming delays. Digital microbeamforming delays may be controlled to be a fixed delay between all elements or may be dynamically changing within the acquisition time. In these cases, a digital controller can calculate the relative delays based on geometric location of channel data or even based on updates of a model, such as a polynomial or hybrid functional.

Although not specifically illustrated, the control logic may also control a multi-phase triggered ADC by triggering the ADC sampling with a system clock that is programmed with the finer time delay resolution than the ADC sampling rate resolution. This effectively allows for interpolated sampling delays incorporated by hardware sampling control. Fine delay lines designed in hardware may sub-divide the time intervals between periods of a larger sampling interval for which the ADC does a sample conversion. A set of programmable registers may control the fine delay line chosen for a specific sub-divided time interval in which to trigger the ADC sample conversion. In general, the sample conversion would be shorter than the larger sampling period, but it is understood that multiple ADCs may be used in concert to multiplex the signal and achieve a shorter sampling period. One possible feature of the control architecture is the ability to subdivide the components of fine delay control with coarse delay control to achieve together the desired accumulated delay. While there are several ways to accomplish this, one advantageous approach may be to use a fractional base 2, where a set of the least significant bits represents the fractional (finer) delay and a set of the most significant bits represents the coarse delay. In this manner, a unified digital calculation of the delay can be used without additional calculation or hardware overhead.

It should further be appreciated that a write and/or a read may be executed one or more times on any one or more memory locations per system or ADC-clock cycle. One exemplary scenario with multiple writes and/or reads is when performing an interpolation between samples. In cases were data is interpolated, two samples or more may be used to do an interpolation calculation. Each sample may be stored locally or within the digital data pipeline with multi-read/write access. Nominally, data may be written and read in a queue fashion (e.g., first-in first-out, FIFO). Also, a multiple-in multiple-out (MIMO), a single-in multiple-out (SIMO), or a multiple-in single-out (MISO) write-read method can be employed within the architecture.

It is further understood that the concept of analog microbeamforming may be combined with the digital microbeamforming approach, wherein the analog combination of signal data through analog circuitry precedes the ADC and the digital microbeamformer. One such example of an analog combination of signals prior to ADC is a signed averaging amplifier (with reference to the cross-coupled switches patent). Another such example is a switched capacitive storage array with timing control circuitry to perform a first stage of a multi-stage microbeamformer, where a subsequent beamforming stage is accomplished digitally.

Figure 7:
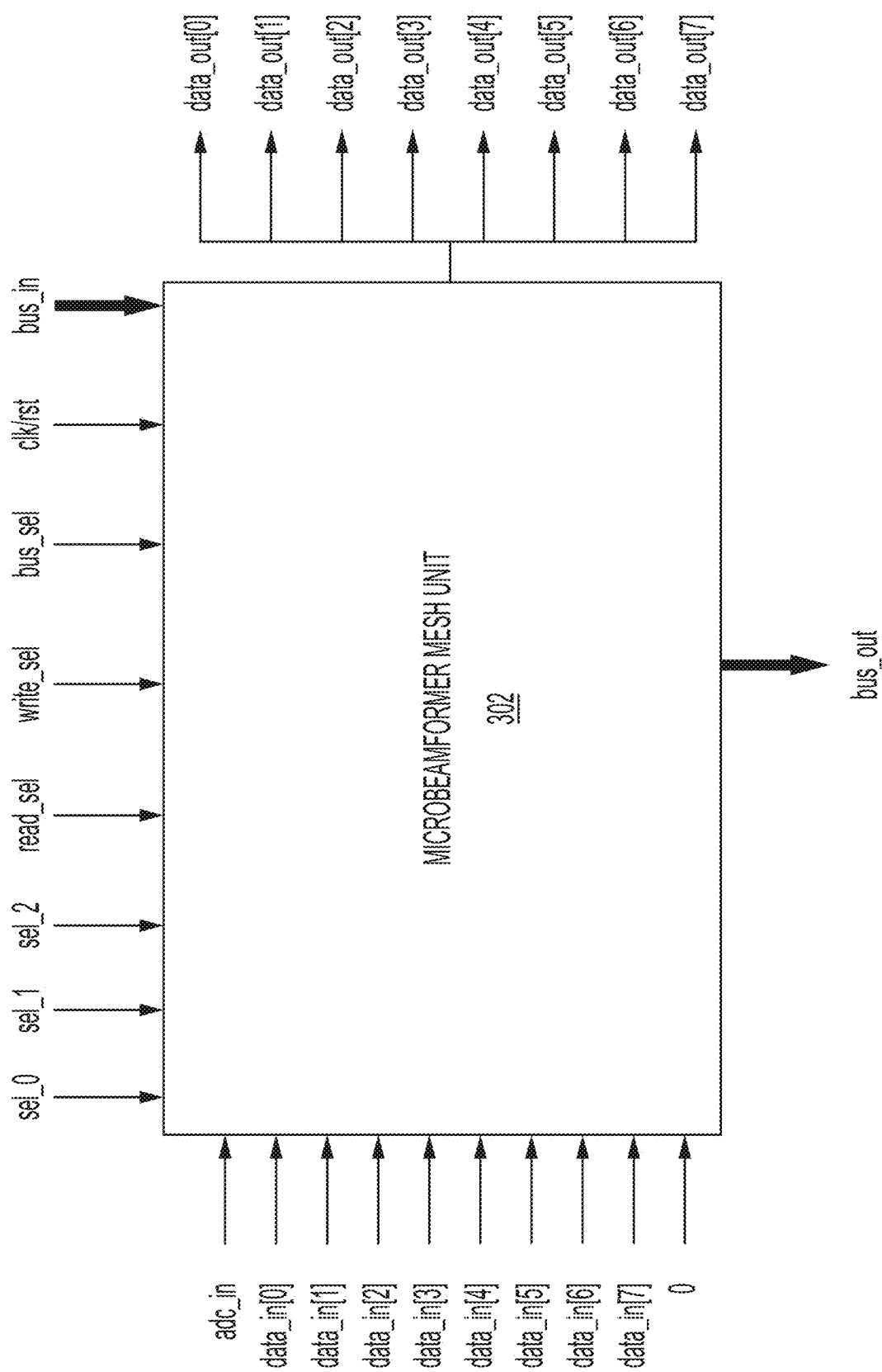
FIG. 7 is a schematic diagram illustrating in further detail the architecture of the individual microbeamformer mesh unit of FIG. 4, according to another exemplary embodiment.
Figure 8:
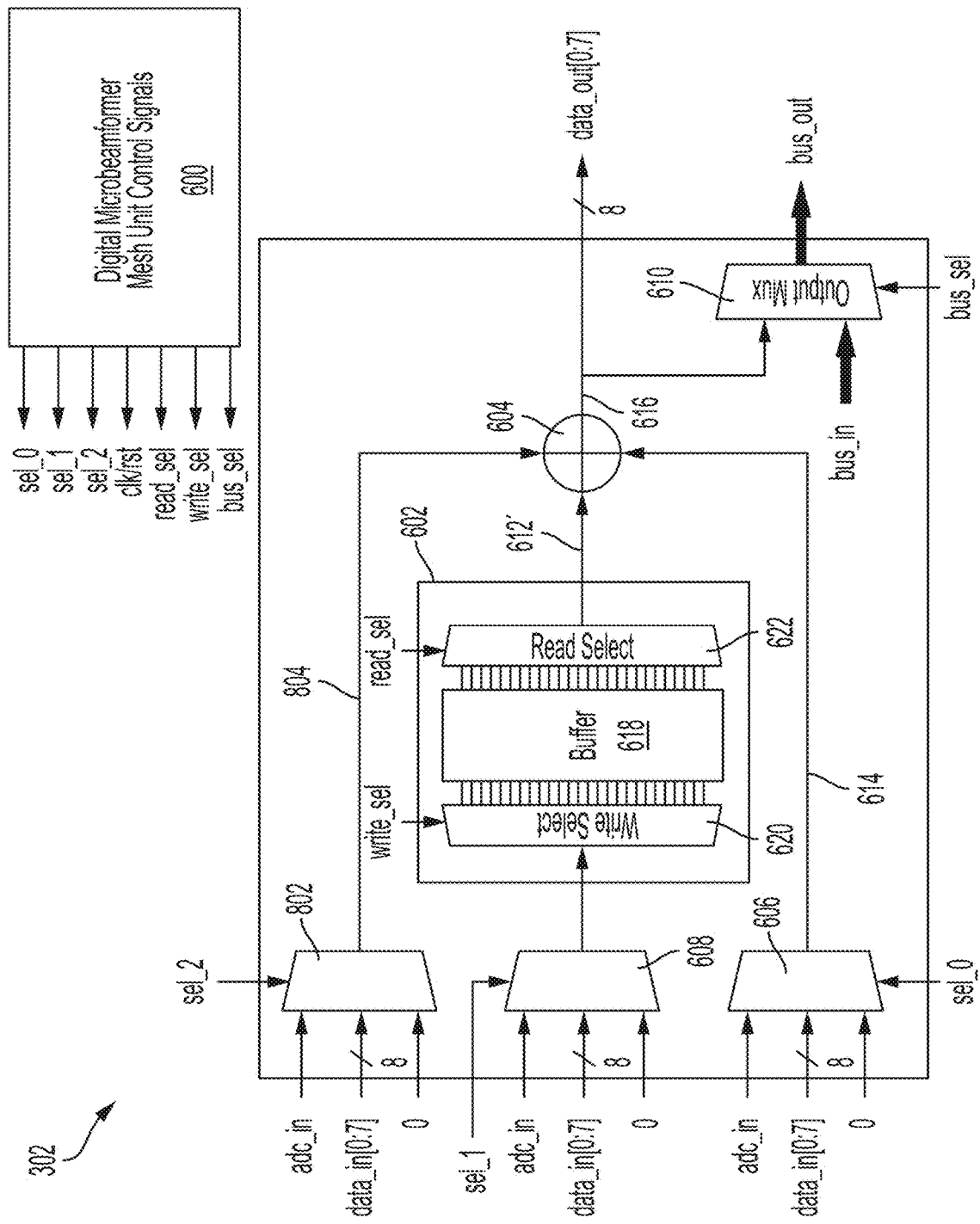
FIG. 8 is a schematic diagram illustrating the individual microbeamformer mesh unit of FIG. 7 in further detail.

The specific number of inputs to be summed (or other operations, e.g., multiplexing, pipelining and/or buffering) of the microbeamforming mesh unit 302 may vary as desired, regardless of the number of clock cycles used to perform the computations. For example, FIG. 7 and FIG. 8 are schematic diagrams illustrating operation of the microbeamforming mesh unit 302 of FIG. 4 according to an alternative embodiment. For ease of illustration, similar components with respect to other embodiments are designated by like reference numbers. By way of comparison to the previously described embodiment, the mesh unit 302 includes an extra multiplexer 802 (FIG. 7) that selects, via control signal sel_2, which of the nine data input signals adc_in, data_in[0], data_in[1], data_in[2], data_in[3], data_in[4], data_in[5], data_in[6], data_in[7] and "0" are passed directly as a third data input stream 804 to the adder 604. The additional mesh data internal connectivity allows for beamforming over subarray elements of various configurations.

Multi-cycle operations may be performed in the architecture to accept input from multiple sources into the multiplexers in a time-multiplexed manner. This can be used as an alternative to a 3-input variation. In such a scenario, the system clock frequency supplied to the mesh unit 302 is running at a rate higher than that of the ADC rate. For example, a system clock rate may be twice the frequency of the ADC rate, where the ADC input is provided for a first odd cycle and another neighbor's input data is provided for a second even cycle. The control logic may combine the odd and even cycle data as needed to effectively reuse the summing (or ALU) hardware between multiple inputs. In this scenario, the hardware of the architecture in FIG. 6 running at a system clock rate, which is double the ADC clock rate, can add up to two pairs of values together per ADC sample or optionally via control logic can operate as an accumulator to sum three values together. Similarly, the hardware of the architecture in FIG. 8 can be controlled to sum up to five values per ADC clock cycle. It is understood that any set of additional ALU operations (e.g., adders, subtractors, multipliers, etc.) could be added to the unit to facilitate multi-input parallelization.

Regardless of the specific mesh unit architecture, a subarray of the digital microbeamformer 108, as an example, may be dynamically configured such that data moves from the node(s) with more delay, and aggregates into the node(s) with lesser delay. Conversely, a node(s) with lesser delay could aggregated into a node(s) with more delay. At this point, the data may be offloaded by some other mechanism. More specifically, in order to pull data out of a final aggregating node in a subarray, another data path is used to stream data out without interfering with other subarray beamformers. In exemplary embodiments, the offload data bus (bus_out) is used, which bus may run at a higher data rate than the microbeamforming pipeline. Therefore, multiple subarrays may share the same data offload bus. In this instance, careful control should be implemented with respect to the bus_sel control signal for the output mux 610 in order to properly time the shoring of the data offload path. In the event even more subarrays need to share a path, then multiple data offload paths may also be implemented.

Figure 9:
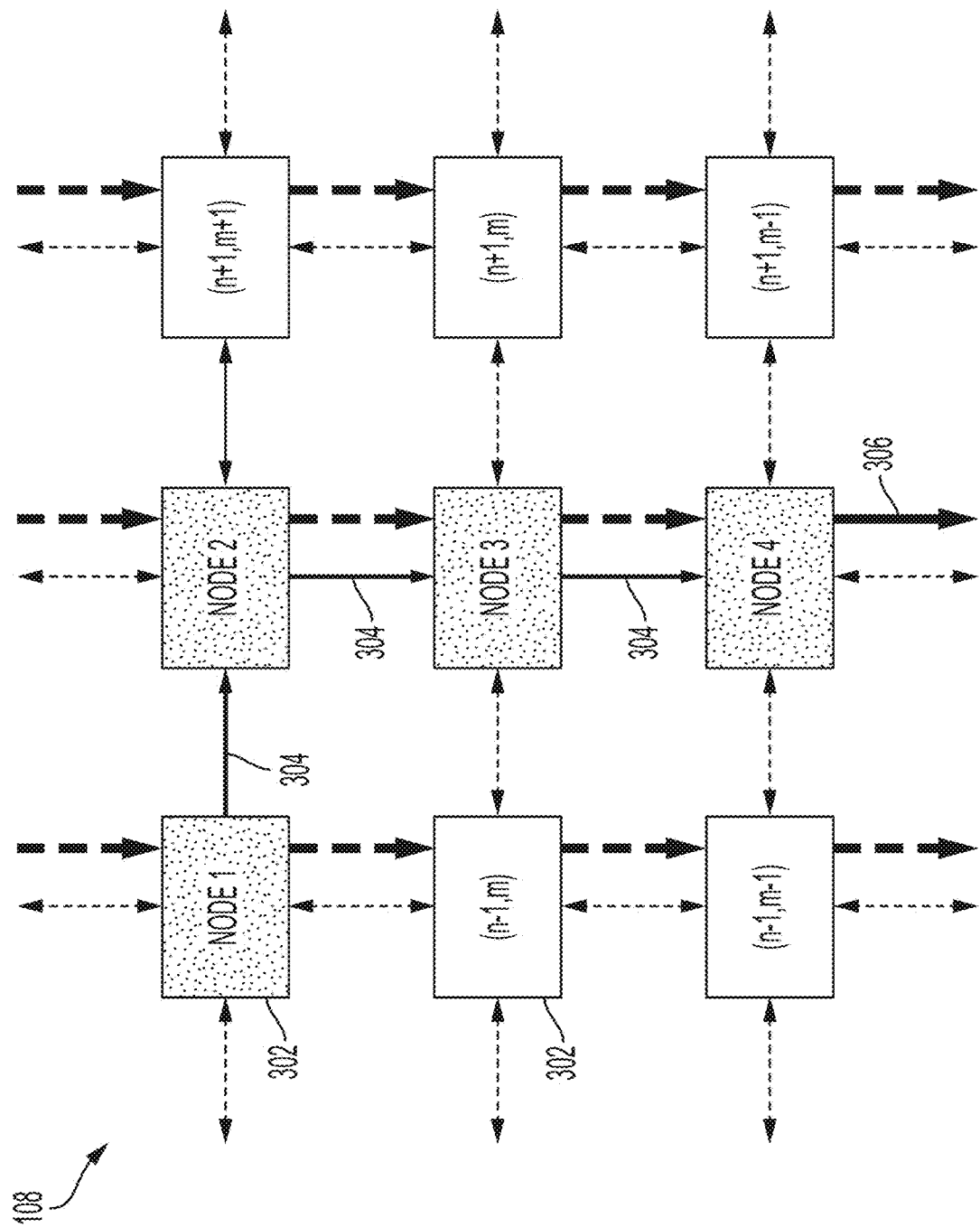
FIG. 9 is a schematic diagram of the mesh-based digital microbeamformer of FIG. 3, highlighted to illustrate an exemplary subarray that is dynamically configured using a combination of four individual microbeamformer mesh units.

Referring now to FIG. 9, the schematic diagram of the mesh-based digital microbeamformer 108 of FIG. 3 is reproduced, and highlighted to illustrate an exemplary subarray that is dynamically configured using a combination of four individual microbeamformer mesh units 302. It should again be appreciated that the specific number and arrangement of mesh units 302 in the subarray is exemplary only. Here, the four mesh units 302 configured in the subarray are shaded and labeled as NODE 1, NODE 2, NODE 3 and NODE 4 (with each node/mesh unit 302 corresponding to a specific ADC channel). Further, in this example the digital microbeamformer subarray is configured to perform the following operations: NODE 1 receives its own channel data, outputs a delayed version of the channel data, but does not sum its delayed channel data with data from another mesh unit. The output data of NODE 1 is input to NODE 2, which also receives its own channel data, generates a delayed version of the same and sums it with the output data of NODE 1. This summed output data from NODE 2 is then input to NODE 3. Similarly, NODE 3 receives its own channel data, generates a delayed version of the same and sums it with the output data of NODE 2. The summed output data from NODE 3 is then input to NODE 4. Finally, NODE 4 receives its own channel data, and sums it with the output data of NODE 3. In this instance the output of NODE 4 is the output of the subarray, and is offloaded on data output bus 306.

To further illustrate examples of how one or more (e.g., each) mesh units 302 (node) in the exemplary subarray of FIG. 9 operate to perform a given delay and sum operation, reference may be made to FIGS. 10-13. The embodiments depicted in FIGS. 10-13 present variations on how to perform the following exemplary microbeamformed output:

$$\text{Output}(t) = \text{ADC}_4(t) + \text{ADC}_3(t-5) + \text{ADC}_2(t-9) + \text{ADC}_1(t-12);$$

wherein $ADC_4$ is the channel data of NODE 4, $ADC_3$ is the channel data of NODE 3, $ADC_2$ is the channel data of NODE 2, and $ADC_1$ is the channel data of NODE 1 in FIG. 9. As will be noted from the above equation, the illustrative subarray is configured to sum an undelayed version of $ADC_4$ data with an offset delay of 5 for $ADC_3$ data, an offset delay of 9 for $ADC_2$ data, and an offset delay of 12 for $ADC_1$ data. As will also be noted from FIGS. 10-13, this function is accomplished using different delay settings for the 4 connected nodes in the subarray. For example, the offset delay for NODE 1 is 1, the offset delay for NODE 2 is 2, the offset delay for NODE 3 is 4, and the offset delay for NODE 4 is 5. Although the delay setting for each node is fixed in the described embodiments, it should be appreciated that time-varying delay settings may also be implemented for one or more nodes. The illustrated example shows how delays may be accumulated within the nodes in order, where the offset delay for NODE 1 represents the most amount of delay with respect to the other nodes and the offset delay for NODE 4 represents the least amount of delay with respect to the other nodes. It will also be appreciated that additional delays may be added before and/or after nodes that are not part of the specifically configured subarray.

Figure 10:
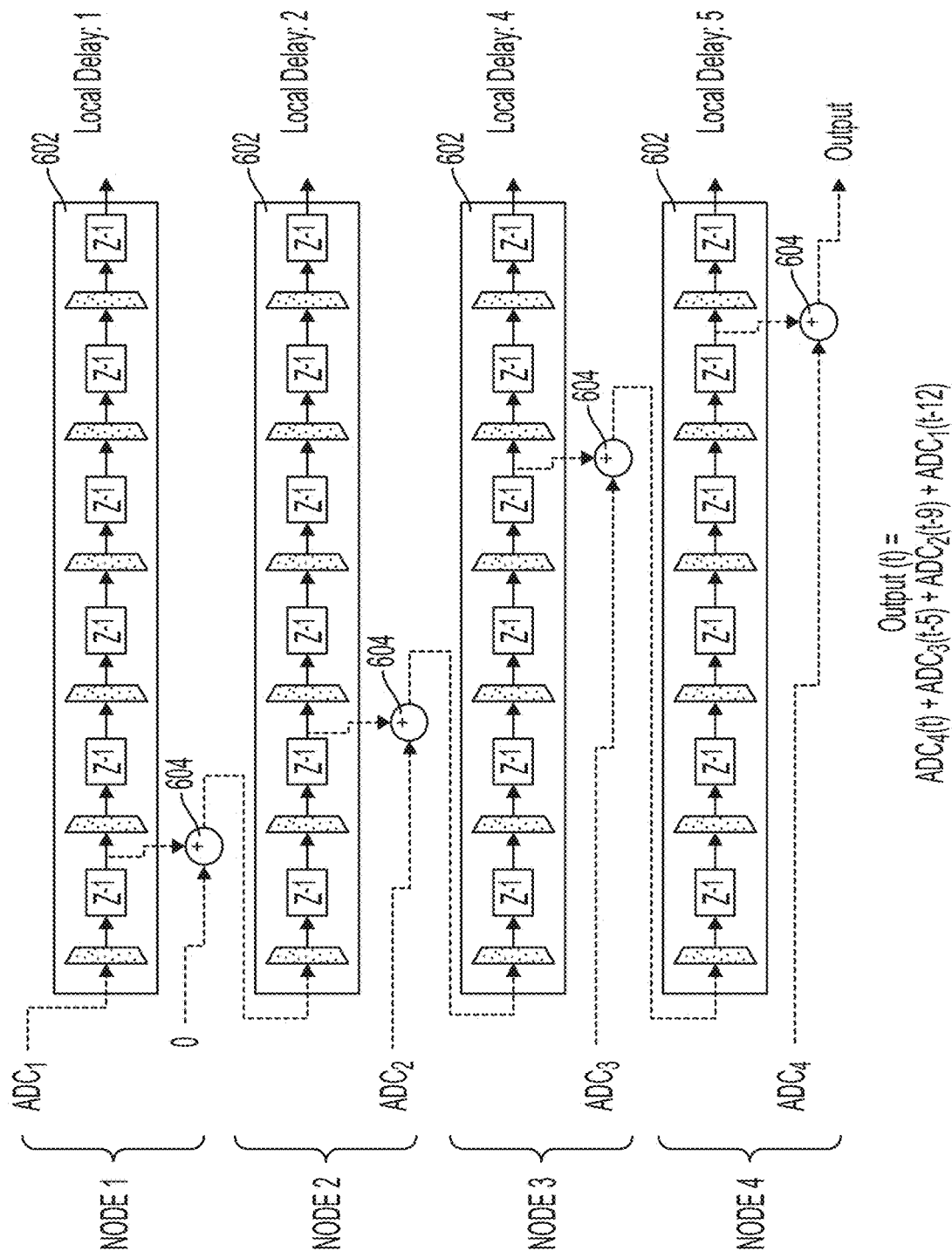
FIG. 10 is a schematic diagram illustrating one possible implementation of a delay operation executed by the subarray illustrated in FIG. 9.

Referring specifically now to FIG. 10, there is shown a schematic diagram illustrating one possible implementation of the above described delay operation executed by the subarray illustrated in FIG. 9. In this embodiment, the input data stream to each delay unit 602 of the respective nodes in the subarray is fed to the first location in the buffer of the delay unit 602. Further, within each node, the output of each delay unit 602 fed to the adder 604 is taken from a location in the buffer corresponding to the local delay set for that delay unit 602. Thus, in the example embodiment, the delay unit 602 for NODE 1 has a local delay of 1, since the input data thereto shifts through 1 delay element; the delay unit 602 for NODE 2 has a local delay of 2, since the input data thereto shifts through 2 delay elements; the delay unit 602 for NODE 3 has a local delay of 4, since the input data thereto shifts through 4 delay elements; and the delay unit 602 for NODE 4 has a local delay of 5, since the input data thereto shifts through 1 delay element. Accordingly, by inspection of the schematic, it is seen that the $ADC_1$ channel data shifts through 1 delay element of the NODE 1 buffer, through 2 delay elements of the NODE 2 buffer, through 4 delay elements of the NODE 3 buffer, and through 5 delay elements of the NODE 4 buffer for a total of 12 delay elements. In addition, the $ADC_2$ channel data shifts through 4 delay elements of the NODE 3 buffer and through 5 delay elements of the NODE 4 buffer for a total of 9 delay elements. The $ADC_3$ channel data shifts through 5 delay elements of the NODE 4 buffer, while the $ADC_4$ channel data passes undelayed to the output data bus.

Figure 11:
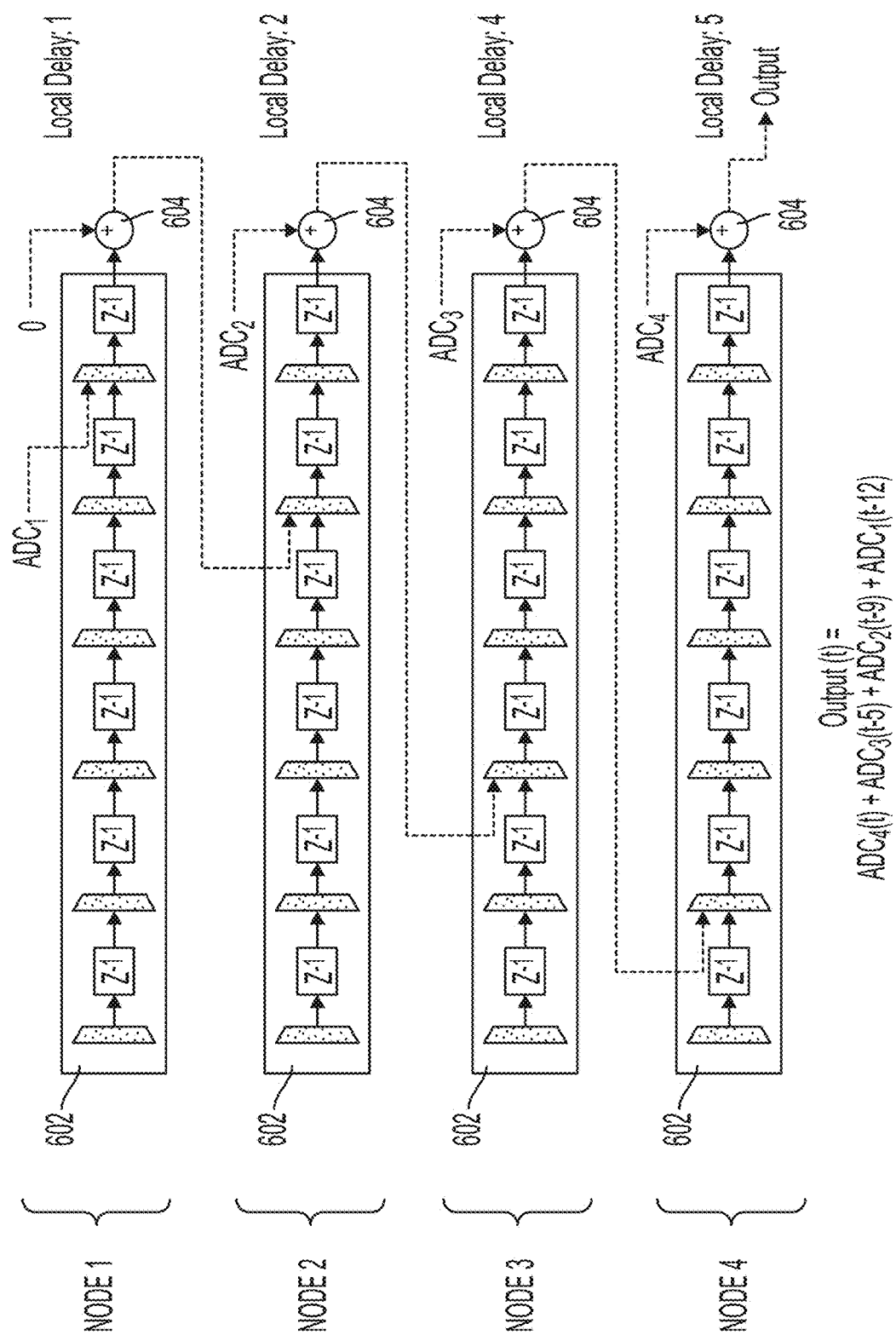
FIG. 11 is a schematic diagram illustrating another possible implementation of the delay operation executed by the subarray illustrated in FIG. 9.

FIG. 11 illustrates a variation of the subarray configuration of FIG. 10. In this embodiment, the input data stream to each delay unit 602 of the respective nodes in the subarray is fed to the location corresponding to the local delay provided by that delay unit 602. Further, within each node, the output of each delay unit 602 fed to the adder 604 is taken from the last location in the buffer. However, regardless of the locations in the buffer of the delay unit 602 to which data is written and from which data is read, the delay and sum functionality of FIG. 10 and FIG. 11 is the same.

Figure 12:
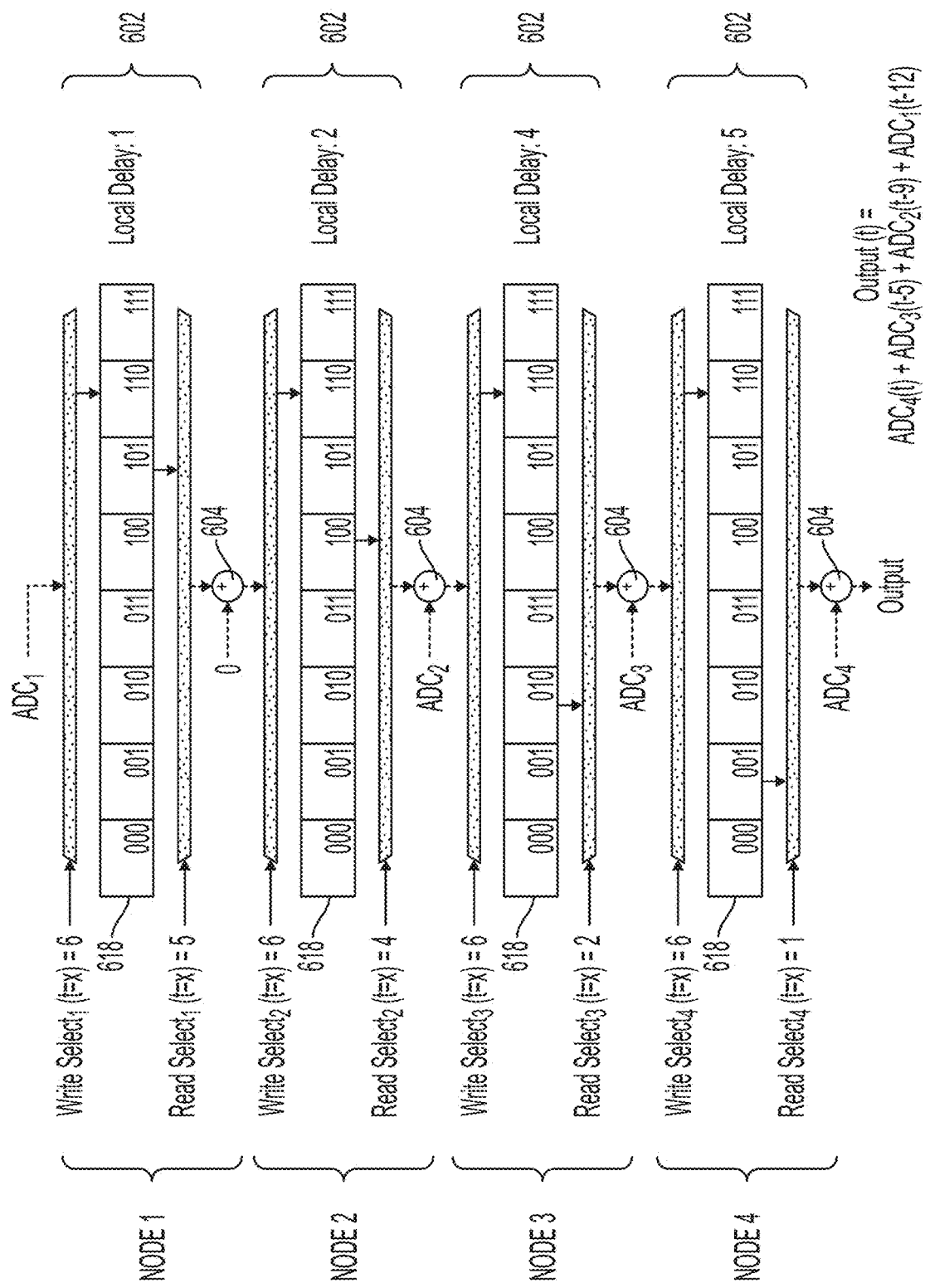
FIG. 12 is a schematic diagram illustrating another possible implementation of the delay operation executed by the subarray illustrated in FIG. 9.
Figure 13:
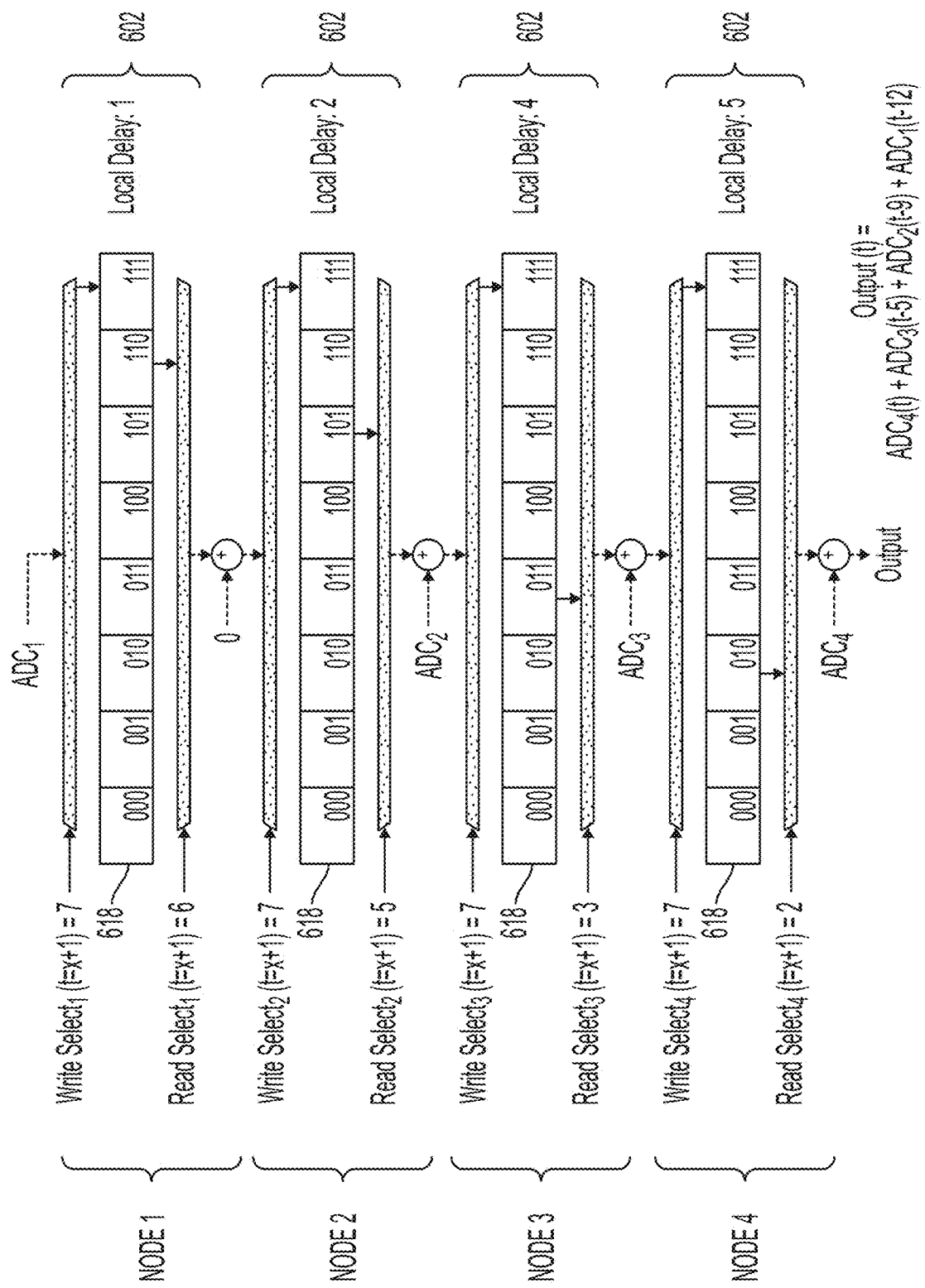
FIG. 13 is a schematic diagram illustrating the implementation of FIG. 12 after the next sequence in time.

FIG. 12 and FIG. 13 illustrate still another example of performing the same microbeamformed output, by using shifting read and write pointers instead of shifting data through the buffer. FIG. 12 illustrates pointer locations at time t=x while FIG. 13 illustrates the pointer locations at time t=x+1. In this exemplary embodiment, the buffer 618 is depicted as an 8-register buffer with address locations 000-111; however, it will be appreciated that differently sized buffers may be used. The local delay for each delay unit 602 is set by differential between the read and write pointer locations. Thus, for example, for NODE 1 the write select pointer address leads the read select pointer address by 1; for NODE 2 the write select pointer address leads the read select pointer address by 2; for NODE 3 the write select pointer address leads the read select pointer address by 3; and for NODE 4 the write select pointer address leads the read select pointer address by 4.

Furthermore, the transition in state between FIG. 12 and FIG. 13 illustrates that the read and write pointers are both incremented by 1 modulo, as may be the case for an addressing scheme used for a circular buffer. It will be appreciated that the addressing scheme used may be any type of addressing logic that reuses memory locations amongst one or many different units together. The latter case is especially useful for distributing a fixed amount of memory amongst the units that need it. Incrementing both read and write pointers by a constant value with modulo instantiates a constant delay; however, a dynamic delay may also be configured by incrementing one of the pointers by more or less than the other on a periodic basis. Such changes are implemented in the logic of the controller and may be based on time-of-flight geometry or some other dynamic time-delay model.

As will thus be appreciated, the above described mesh-based, digital microbeamforming architecture embodiments allow for the construction of a dynamically adjustable, incrementally fine delay profile. Because the maximum delay between adjacent transducer elements is significantly smaller than the maximum delays across units within an array aperture and even across a subarray, a relatively small delay unit may be implemented.

The techniques described herein are exemplary, and should not be construed as implying any particular limitation on the present disclosure. It should be understood that various alternatives, combinations and modifications could be devised by those skilled in the art from the present disclosure. For example, steps associated with the processes described herein can be performed in any order, unless otherwise specified or dictated by the steps themselves. The present disclosure is intended to embrace all such alternatives, modifications and variances that fall within the scope of the appended claims.

According to an aspect of the application, an ultrasound device is provided, comprising a digital microbeamformer configured to perform beamforming within subarrays of an ultrasonic transducer array.

According to an aspect of the application, a method of performing beamforming with an ultrasound device is provided, the method comprising beamforming within individual subarrays of an ultrasonic transducer array. In some embodiments, the method further comprises beamforming across the subarrays. In some embodiments, the beamforming within individual subarrays comprises digitally beamforming.

What is claimed is:
1. A digital microbeamformer apparatus for an ultrasound system, comprising:
    a plurality of interconnected nodes, one or more nodes corresponding to at least one channel of the ultrasound system;

one or more nodes configured to communicate data with one or more other nodes via a corresponding beamforming data path; and one or more nodes coupled to a data output bus shared by one or more other nodes.

2. The apparatus of claim 1, wherein one or more nodes communicates data with at least four neighboring nodes.

3. The apparatus of claim 1, wherein one or more nodes communicates data with at least eight neighboring nodes.

4. The apparatus of claim 1, wherein one or more nodes further comprises:

a digital delay unit, the digital delay unit having an input coupled to a first selected one of a plurality of beamforming data inputs; and an arithmetic logic unit, the arithmetic logic unit configured to combine an output of the digital delay unit with a second selected one of the plurality of beamforming data inputs to generate a beamforming data output.

5. The apparatus of claim 4, wherein one or more nodes further comprises:

a first multiplexer configured to select one of the plurality of beamforming data inputs; and a second multiplexer configured to select one of the plurality of beamforming data inputs, wherein the first multiplexer and second multiplexer are controlled by independent control signals.

6. The apparatus of claim 5, wherein one or more nodes further comprises a third multiplexer configured to selectively couple the beamforming data output to the data output bus.

7. The apparatus of claim 4, wherein the beamforming data output comprises an input to one or more other nodes.

8. The apparatus of claim 4, wherein the digital delay unit further comprises:

a buffer;

write select circuitry configured to control a first location in the buffer to which a data input stream is to be written; and read select circuitry configured to control a second location in the buffer from which to read data to be provided as delayed data input stream to the arithmetic logic unit.

9. The apparatus of claim 8, wherein the digital delay unit is configured to shift the data input stream though one or more delay elements of the buffer.

10. The apparatus of claim 9, wherein the digital delay unit further comprises:

a buffer;

write select circuitry configured to control a first location in the buffer to which a data input stream is to be written; and read select circuitry configured to control a second location in the buffer from which to read data to be provided as delayed data input stream to the arithmetic logic unit.

11. The apparatus of claim 10, wherein the digital delay unit is configured to shift the data input stream though one or more delay elements of the buffer.

12. The apparatus of claim 10, wherein digital delay unit is configured to shift read and write pointers to the buffer.

13. The apparatus of claim 8, wherein digital delay unit is configured to shift read and write pointers to the buffer.

14. The apparatus of claim 1, wherein one or more nodes further comprises:

a digital delay unit, the digital delay unit having an input coupled to a first selected one of a plurality of beamforming data inputs; and an arithmetic logic unit, the arithmetic logic unit configured to combine an output of the digital delay unit with a second selected one of the plurality of beamforming data inputs and a third selected one of the plurality of beamforming data inputs to generate a beamforming data output.

15. The apparatus of claim 14, wherein one or more nodes further comprises:

a first multiplexer configured to select one of the plurality of beamforming data inputs;

a second multiplexer configured to select one of the plurality of beamforming data inputs; and a third multiplexer configured to select one of the plurality of beamforming data inputs, wherein the first multiplexer, second multiplexer and third multiplexer are controlled by independent control signals.

16. The apparatus of claim 15, wherein one or more nodes further comprises a fourth multiplexer configured to selectively couple the beamforming data output to the data output bus.

17. The apparatus of claim 14, wherein the beamforming data output comprises an input to one or more other nodes.

18. An ultrasound system, comprising:

a metal oxide semiconductor (MOS) die having ultrasonic transducers and integrated circuitry formed thereon, the integrated circuitry further including a digital micro-beamformer apparatus having a plurality of interconnected nodes, one or more nodes corresponding to at least a single channel of the ultrasound system;

one or more nodes configured to communicate data with one or more other nodes via a corresponding beamforming data path.

19. The system of claim 18, wherein one or more nodes communicates data with at least four neighboring nodes.

20. The system of claim 18, wherein one or more nodes communicates data with at least eight neighboring nodes.

21. The system of claim 18, wherein one or more nodes further comprises:

a digital delay unit, the digital delay unit having an input coupled to a first selected one of a plurality of beamforming data inputs; and an arithmetic logic unit, the arithmetic logic unit configured to combine an output of the digital delay unit with a second selected one of the plurality of beamforming data inputs to generate a beamforming data output.

22. The system of claim 21, wherein one or more nodes further comprises:

a first multiplexer configured to select one of the plurality of beamforming data inputs; and a second multiplexer configured to select one of the plurality of beamforming data inputs, wherein the first multiplexer and second multiplexer are controlled by independent control signals.

23. The system of claim 22, wherein one or more nodes further comprises a third multiplexer configured to selectively couple the beamforming data output to the data output bus.

24. The system of claim 21, wherein the beamforming data output comprises an input to each of the one or more other nodes.

25. The system of claim 21, wherein the digital delay unit further comprises:

a buffer;

write select circuitry configured to control a first location in the buffer to which a data input stream is to be written; and read select circuitry configured to control a second location in the buffer from which to read data to be provided as delayed data input stream to the arithmetic logic unit.

26. The system of claim 25, wherein the digital delay unit is configured to shift the data input stream though one or more delay elements of the buffer.

27. The system of claim 25, wherein digital delay unit is configured to shift read and write pointers to the buffer.

28. The system of claim 18, wherein one or more nodes further comprises:
   a digital delay unit, the digital delay unit having an input coupled to a first selected one of a plurality of beamforming data inputs; and
   an arithmetic logic unit, the arithmetic logic unit configured to combine an output of the digital delay unit with a second selected one of the plurality of beamforming data inputs and a third selected one of the plurality of beamforming data inputs to generate a beamforming data output.

29. The system of claim 28, wherein one or more nodes further comprises:
   a first multiplexer configured to select one of the plurality of beamforming data inputs;
   a second system configured to select one of the plurality of beamforming data inputs; and
   a third system configured to select one of the plurality of beamforming data inputs, wherein the first multiplexer, second multiplexer and third multiplexer are controlled by independent control signals.

30. The system of claim 29, wherein one or more nodes further comprises a fourth multiplexer configured to selectively couple the beamforming data output to the data output bus.

31. The system of claim 28, wherein the beamforming data output comprises an input to each of the one or more other nodes.

32. The system of claim 28, wherein one or more nodes is coupled to a data output bus shared by one or more other nodes.

33. The system of claim 28, wherein the digital delay unit further comprises:
   a buffer;
   write select circuitry configured to control a first location in the buffer to which a data input stream is to be written; and
   read select circuitry configured to control a second location in the buffer from which to read data to be provided as delayed data input stream to the arithmetic logic unit.

34. The apparatus of claim 33, wherein the digital delay unit is configured to shift the data input stream though one or more delay elements of the buffer.

35. The apparatus of claim 33, wherein digital delay unit is configured to shift read and write pointers to the buffer.

* * * * *